Dec. 19, 1950     G. C. NEWTON, JR     2,534,293
SERVOMOTOR AND SYSTEM HAVING IMPROVED
TORQUE CHARACTERISTICS
Filed Dec. 21, 1946
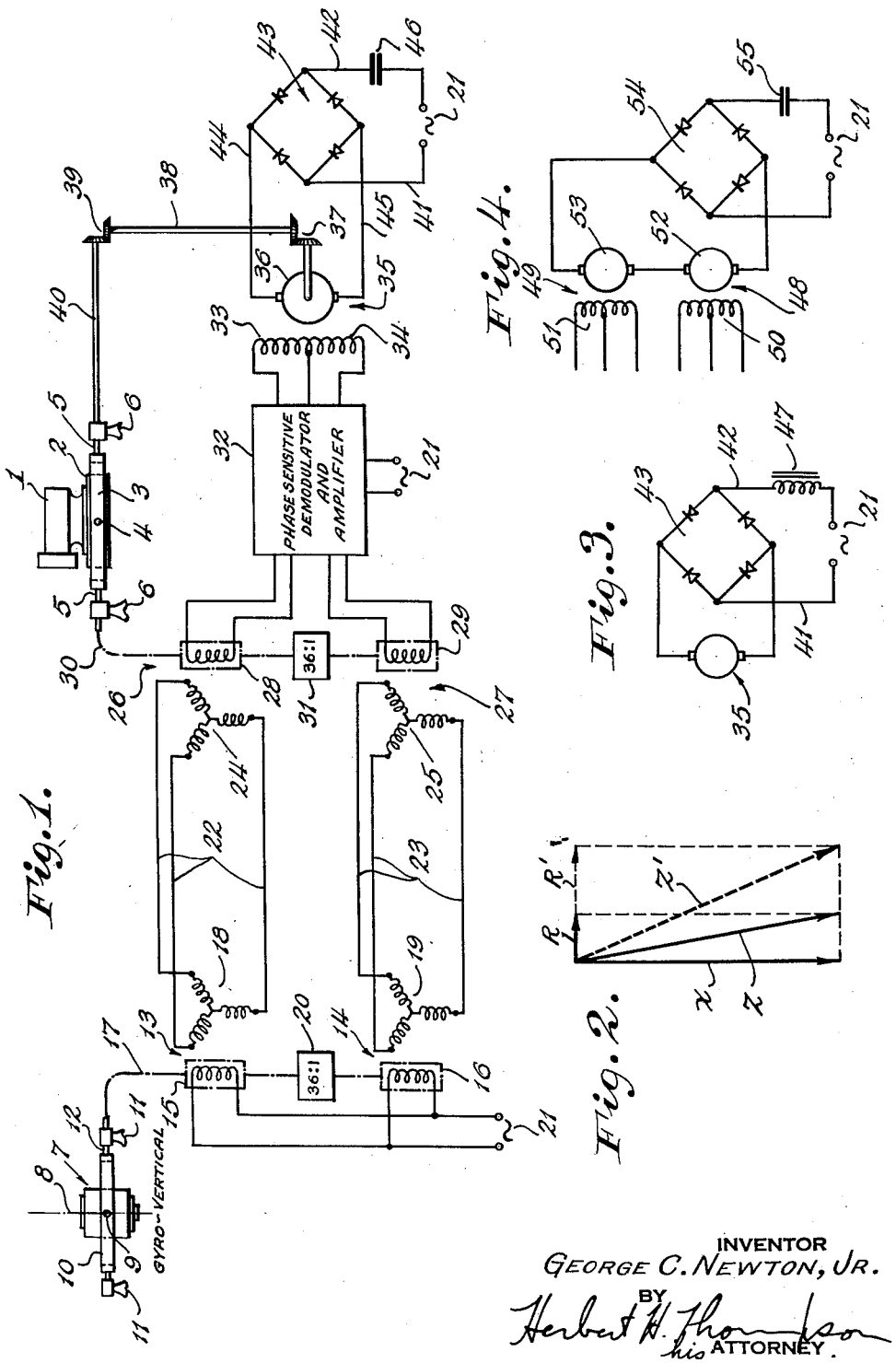
INVENTOR
GEORGE C. NEWTON, JR.
BY
Herbert H. Thompson
his ATTORNEY.

Patented Dec. 19, 1950

2,534,293

UNITED STATES PATENT OFFICE 2,534,293

SERVOMOTOR AND SYSTEM HAVING IMPROVED TORQUE CHARACTERISTICS

George C. Newton, Jr., Cambridge, Mass., assignor to The Sperry Corporation, a corporation of Delaware Application December 21, 1946, Serial No. 717,720

1 Claim. (Cl. 318—432)

My invention relates to a servomotor, particularly a direct current motor, which is arranged to supply a substantially constant torque output throughout the range of operating speeds thereof. Ordinarily, the torque output of a motor varies inversely with its speed. However, there are many applications for motors in which it is very desirable that the torque output be dependent upon the field current and independent of motor speed throughout the speed range of the motor, or, that the drop in torque be relatively small. In motors of the character to which the present invention particularly relates, it is the usual practice to control the field excitation thereof in order to vary the motor speed while the armature is supplied from a substantially constant armature current source.

The present invention has for its primary object the provision of a motor of the foregoing character and also a servo system embodying such a motor wherein the direct current supplied to the motor armature is maintained substantially constant regardless of back E. M. F. or has, at the most, a relatively small drop whereby the torque output of the motor will be dependent upon the field current and substantially independent of motor speed.

A motor embodying the features of the present invention is particularly adapted for use in stabilizing a scanner, such, for example, as an infra red scanner and hence, in the drawings and in the following, I have illustrated and described my invention in this particular and exemplary use.

In stabilizing a scanner or similar device, wind, for example, provides a load which may be constant for any value of wind velocity. Of course, wind velocities vary. Under such conditions, it is desirable that the stabilizing motor have a torque output which is dependent upon the field current, which in turn is dependent upon the controlling signal voltage which controls the rate and direction of said motor, and independent of the motor speed throughout the various speeds at which it may operate in stabilizing the scanner or platform on which it is mounted.

More particularly, it is an object of the present invention to provide a D. C. motor having an armature to which rectified alternating current is supplied through a circuit embodying means for maintaining the armature current substantially constant throughout the range of speeds of the motor.

Another object of the present invention resides in providing a motor of the foregoing character in which an impedance is connected in circuit between the A. C. source and the rectifier for maintaining substantially constant armature current.

Further objects reside in providing a motor of the foregoing character in which an impedance having a reactance component such as a condenser or a choke are connected in circuit between the alternating current source and the rectifier.

Still another object resides in providing a servo system embodying a motor, the armature current of which is controlled in any of the above manners, and the field of which is energized in accordance with the polarity or phase sense and the amplitude of a control signal so that the direction of operation of the motor is dependent upon the polarity or phase sense of the control signal and the speed is dependent upon the amplitude of the signal with the torque output substantially independent of the motor speed.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

With the foregoing and still other objects in view, my invention includes the novel elements, and the combinations and arrangements thereof described below and illustrated in the accompanying drawings, wherein—

Fig. 1 schematically represents a servomotor system embodying a motor of the present invention arranged and controlled to stabilize a scanner about one of its axes;

Fig. 2 illustrates vectorially the impedance values of the components of the motor armature circuit;

Fig. 3 represents diagrammatically a modified form of control circuit for the armature current; and Fig. 4 illustrates a still further modification.

Referring now to Fig. 1, I indicates generally a scanner which may be mounted for rotation in azimuth on a stabilized platform 2 which is supported in gimbal ring 3 to rotate about axis 4, and the gimbal ring 3 is in turn rotatably supported by trunnions 5 journaled in suitable supports 6. The axis of trunnions 5 is preferably normal to the axis 4 of the stabilized platform in order that the scanner may be stabilized in roll and pitch, and it will be understood that a system similar to that described below may be employed to stabilize the platform about the axis 4.

Although I have herein illustrated and described a preferred embodiment of my invention as applied to the stabilization of a scanner, it will be understood that my invention is not necessarily limited thereto but may be employed in any application where a D. C. motor having substantially constant torque output characteristics is preferably employed.

As a stabilizing reference, I have schematically shown a gyro vertical indicated generally at 7, the spin axis 8 thereof providing a vertical reference and the gyro being rotatably supported about axis 9 in gimbal ring 10 which is journaled in the casing 11 of the instrument by means of trunnions 12. For the purpose of illustration, it will be assumed that the trunnions 12 of the gyro vertical parallel the trunnions 5 of the gimbal ring of the stabilized platform, and these axes may constitute either roll or pitch axes. The stabilizing system preferably employs, as shown, a coarse and fine data transmission system. These systems respectively comprise the transmitters 13 and 14 which may be of the Selsyn or any desired synchronous type, the rotors 15 and 16 of which are rotated relative to the stators with movements of the gimbal ring 10 of the gyro vertical relative to the casing. This connection is shown schematically by the dot-dash line 17 which is intended to designate any suitable type of motion transmitting linkage. The stators 18 and 19 of the transmitters are both relatively fixed with respect to the rotors. The rotor of the coarse transmitter is usually connected in a 1:1 ratio with the gimbal ring 10 so that it will move relative to its stator through the same angular amount as the gimbal ring tilts with respect to the casing of the instrument. In the present case, this ratio is preferably 2:1 although a 1:1 ratio may be employed. The rotor of the fine transmitter, however, is connected through a suitable gearing 20 as schematically indicated by the dot-dash line to provide a 36:1 ratio of angular rotation of the rotor 16 relative to the rotor 15 of the coarse transmitter or the gimbal ring 10. The gear ratio of gearing 20 may be of any desired ratio.

It will be understood that the coarse data transmission system serves to supply a signal voltage in the output of the receiver therein which is directly proportional in amplitude to the angular error between the gyro vertical and the stabilized platform measured about the similar or parallel axes thereof. The fine system, on the other hand, by virtue of the high ratio of angular rotation of the rotors of the transmitter and receiver therein relative respectively to the reference or gyro vertical and stabilized platform, serves to supply a much higher error voltage for small actual angular errors and hence provides quicker and more accurate synchronization of the platform with the reference.

The single phase windings of the rotors 15 and 16 of the transmitters 13 and 14 are connected across a suitable source of alternating current 21. The stator windings which may be Y or delta connected are respectively connected through leads 22 and 23 with the similarly interconnected stator windings 24 and 25 of the synchro receivers or signal generators 26 and 27. The stators 24 and 25 of the receivers are relatively fixed with respect to the rotors 28 and 29 in the same manner as the stators of the transmitters are fixed relative to their rotors.

The rotors 28 and 29 of the receivers are connected to rotate with the gimbal ring 3 of the stabilized platform in a manner similar to the association of the rotors of the transmitters with the gyro vertical. The dot-dash line 30 schematically indicates that the rotor 28 is associated with or directly connected with the trunnions 5 of the gimbal ring 3 so that it will rotate in the same ratio with respect thereto as the rotor 15 of the transmitter 13 with respect to the gimbal ring 10 of the gyro vertical, and both thereof may be connected in either a 1:1 or 2:1 ratio with respect to the associated gimbal rings. The rotor 29 of receiver 27, however, is connected through suitable gearing 31 and associated connections represented by the dot-dash line in the same ratio, such as, for example, 36:1, as the rotor 16 of transmitter 14 relative to the gimbal ring of the gyro vertical.

The single phase windings of the receiver rotors 28 and 29 are connected to a phase-sensitive demodulator and amplifier indicated generally at 32, the signal voltages derived from both receivers serving to control the output of the demodulator. This demodulator and amplifier may be of any conventional construction and is supplied with alternating current for phase sensing purposes, preferably from alternating current source 21 which is used in exciting the synchro transmitter. The outputs of the amplifier are preferably differential unidirectional voltages which are applied in a differential manner to the field windings 33 and 34 of a D. C. servomotor indicated generally at 35. The magnitude of the resultant unidirectional voltage will be dependent upon the amplitude of the input signals while the polarity sense of the resultant unidirectional voltage will depend upon the phase sense of the input signals. In other words, the direction of the resultant field provided by the field windings 33 and 34 will depend upon the phase sense of the signal voltages derived from the fine and coarse receivers which, in turn, will depend upon the direction of relative movement between the stabilized platform and the gyro vertical, and the magnitude of the resultant field will depend upon the amount of angular disagreement between the platform and the gyro reference.

Armature 36 of the motor 35 is connected in any suitable manner such as by gearing 37, shaft 38, gearing 39 and shaft 40 to drive the gimbal ring 3 about the axis of trunnions 5.

In accordance with my invention and in order that the torque output of the servomotor 35 be substantially independent of motor speed throughout the range of speeds of the servomotor under the control of the signals derived from the data transmission systems, I supply the armature thereof with direct current derived from a rectifier which is connected with a suitable A. C. source. This source, indicated as source 21, preferably supplies an alternating voltage of substantially constant amplitude and is connected through leads 41 and 42 across one diagonal of a bridge rectifier indicated generally at 43. The rectifier, as is well known, may include oxide type rectifier units in each leg thereof, and the opposite diagonal of the bridge is connected through leads 44 and 45 to the armature of the motor. In order to maintain a substantially constant armature current, I have interposed in one of the leads between the alternating potential source and the bridge rectifier an impedance and preferably one having a reactance component such, for example, as the condenser 46 shown in Fig. 1.

The operation of an impedance having a reactance component for maintaining a substantially constant armature current may best be explained in connection with the vector representation in Fig. 2. The resistance of the motor armature may be considered as a variable, varying with the speed of the motor, and the reactance of the condenser is a constant and much greater in value than the resistance of the armature. The resistance of the motor armature is treated as a variable because the back E. M. F. of the motor varies with speed and, with respect to the applied armature voltage, the armature resistance appears as a variable. In Fig. 2, the vector R represents the resistance of the motor armature, while the vector X represents the reactance of the condenser. Neglecting the impedance values of other components in the motor armature circuit, the total impedance thereof is represented by the vector Z, which follows the equation:

$$Z = \sqrt{R^2 + \left(\frac{1}{J\omega C}\right)^2}$$

The relative values of R and X shown in Fig. 2 are purely illustrative to show that the total impedance in the armature circuit is made up mostly of reactance. Hence, when the resistance of the armature varies such as indicated by the dotted vector R', the resultant or total impedance will not vary to any great extent as represented by the dash-line vector Z'. Therefore, since $$I = \frac{E}{Z}$$

and since Z or the total impedance varies only to a relatively small extent as compared to variations in R or the armature resistance, the current I in the circuit, dependent on Z or the total impedance, will be substantially constant, or, will not fall off to any material extent with increasing speeds. Since the armature current is maintained substantially constant in the foregoing manner, the torque output of the motor will be substantially independent of the motor speed and dependent upon the field current.

In Fig. 3, I have shown a modification of my motor control circuit wherein a choke 47, instead of a condenser, is connected in the lead 42 between the alternating potential source and the rectifier. Since a choke has a reactance component, its function in maintaining the armature current substantially constant may be explained in substantially the same manner as in the above explanation of the condenser 46.

Fig. 4 shows a further modification of my invention wherein 48 represents generally the stabilizing motor employed to drive the stabilized platform about one of its axes of support, such as the pitch axis, while 49 represents a second motor for driving the stabilized platform about its other axis of support, such as the roll axis. The differential field windings 50 and 51, respectively, of these motors may each be controlled through systems of the character illustrated in Fig. 1, one thereof being controlled from pick-offs associated with the roll axes of the stabilized platform and the gyro vertical and other being controlled from pick-offs associated with the pitch axes. The armatures 52 and 53 of these motors are connected in series as shown and across one diagonal of the bridge rectifier 54. With this arrangement, substantially constant armature current will be supplied to the armatures of both motors and if desired additional motor armatures may be connected in series therewith, and with this arrangement a single bridge rectifier having an impedance such as the condenser 55 connected in circuit on the A. C. side thereof may be employed to provide substantially constant torque outputs by all of the D. C. motors connected in circuit therewith.

Briefly, the operation of the system shown in Fig. 1 is as follows. Assuming that the spin axis of the gyro 7 provides a vertical reference and it will be assumed that the entire system shown in Fig. 1 is mounted on a craft capable of experiencing pitch and roll movements, relative movement between the gimbal ring 10 of the gyro vertical and the stabilized platform 2 of the scanner about their corresponding axes defined by the trunnions 12 and 5, respectively, will produce a signal voltage input to the phase sensitive amplifier 32. These signal voltages are derived from the receivers in the fine and coarse transmission systems, and the output of the amplifier will cause the servomotor 35 to drive the gimbal ring 3 of the scanner to a position wherein the signal voltages are reduced to zero. Movement of either the rotor of the transmitter or the receiver in either or both systems away from synchronous positions thereof will produce such signal voltages. Hence, the system of Fig. 1 will function to stabilize the scanner about one of its axes of support, that is, in part to maintain the gimbal ring 3 horizontal through rotation thereof on trunnions 5 in accordance with the reference provided therefor by the gyro vertical 7, and a similar arrangement may be provided for maintaining the platform horizontal through rotation thereof about the axis 4 on the gimbal ring 3 also in accordance with the reference provided by the gyro vertical. In each case, the stabilizing motors of the present invention will provide torque outputs which are dependent upon the field current in the respective motors and which are substantially independent of the respective motor speeds in maintaining the platform substantially horizontal during roll and pitch movements of the craft.

While I have described my invention in its preferred embodiments, it will be understood that the words which I have used are words or description rather than of limitation and that changes within the purview of the appended claim may be made without departing from the true scope and spirit of my invention in its broader aspects.

What is claimed is:

A servomotor system for providing a substantially constant torque over a range of operating speeds comprising a substantially constant alternating current source, a four-element full wave rectifier bridge having one corner directly connected to a first terminal of said source, a reactance connected between the opposite corner of said bridge and the second terminal of said source, a source of amplified unidirectional control voltage, and a direct current servomotor having its armature connected across the two remaining corners of said bridge and its field windings connected to said source of control voltage whereby the speed and direction of rotation of said motor may be controlled, the value of said reactance being high compared to the resistance of the motor armature and of such magnitude that the armature current will be substantially constant throughout a range of operating speeds of the motor.

GEORGE C. NEWTON, Jr.

REFERENCES CITED

The following references are of record in the file of this patent:

UNITED STATES PATENTS

| Number | Name | Date |
| --- | --- | --- |
| 2,081,780 | Troger | May 25, 1937 |